United States Patent
Nangare et al.

(10) Patent No.: US 12,260,878 B1
(45) Date of Patent: Mar. 25, 2025

(54) METHOD AND APPARATUS FOR MULTI-STAGE EQUALIZATION FOR READING DATA FROM STORAGE MEDIA

(71) Applicant: Marvell Asia Pte Ltd, Singapore (SG)

(72) Inventors: Nitin Nangare, Sunnyvale, CA (US); Han-Ting Chiang, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/601,698

(22) Filed: Mar. 11, 2024

Related U.S. Application Data

(60) Provisional application No. 63/451,209, filed on Mar. 9, 2023.

(51) Int. Cl.
*G11B 20/10* (2006.01)

(52) U.S. Cl.
CPC .............. *G11B 20/10046* (2013.01)

(58) Field of Classification Search
CPC .......... G11B 20/10046; G11B 5/012; G11B 20/10009; G11B 20/10037; G11B 5/3964; G11B 5/4976; G11B 5/09; G11B 2220/90; G11B 2220/29; G11B 20/1413; G11B 15/1875; G11B 15/44; G11B 5/6005; G11B 5/59633
USPC ......................................................... 360/65
See application file for complete search history.

(56) References Cited

U.S. PATENT DOCUMENTS 9,431,052 B2 *   8/2016   Oberg .............. G11B 20/10037

\* cited by examiner

*Primary Examiner* — Nabil Z Hindi

(57) ABSTRACT

Data read from a storage medium is first processed through a first data path including a first decoder configured to decode data output from at least one first finite impulse response (FIR) filter and first FIR adaptation circuitry configured to adjust a first FIR coefficient for the at least one first FIR filter. The data is then processed through a second data path, which includes at least one second FIR filter and second FIR adaptation circuitry configured to adjust a second FIR coefficient to reach an FIR coefficient that achieves a target minimum number of errors. The second FIR adaptation circuitry is configured to reach the FIR coefficient that achieves the target minimum number of errors faster than the first FIR adaptation circuitry. A second decoder in the second data path is configured to decode data output by the at least one second FIR filter.

33 Claims, 4 Drawing Sheets

METHOD AND APPARATUS FOR MULTI-STAGE EQUALIZATION FOR READING DATA FROM STORAGE MEDIA

CROSS REFERENCE TO RELATED APPLICATION

This disclosure claims the benefit of commonly-assigned U.S. Provisional Patent Application No. 63/451,209, filed Mar. 9, 2023, which is hereby incorporated by reference herein in its entirety.

FIELD OF USE

This disclosure relates to architectures for improved reading of data from magnetic storage media (e.g., hard disk drives) using multiple stages of finite impulse response (FIR) filter adaptation.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter. Data recorded at different radial positions of each head are referred to "tracks" of data.

Data on adjacent tracks may or may not be independent of one another. As areal densities for magnetic data storage continue to increase, reading may be performed using read heads or sensors having dimensions comparable to the track width. Therefore, it is important to be able to distinguish data on one track from data on another track, despite "inter-track interference" (ITI).

Additionally, in two-dimensional magnetic recording (TDMR), two read heads are employed simultaneously to read data on a track. The position of one or both of the heads may be offset relative to the center of the track. Therefore, it is also important to be able to compensate for such offset in order to accurately read the data on the track.

Traditional systems perform such compensation by adjusting three parameters of the decoder circuit: signal gain, sampling frequency (or "timing"), and FIR equalization filter coefficients. Each of these parameters can be adjusted individually. However, there is some interplay between the parameters which affects how quickly they may be adjusted in order to provide stable samples. Gain may be adjusted the fastest, as it simply changes the signal-to-noise ratio of the signal received from a read head. Timing adjustments must be made more slowly, and FIR coefficient adaptation is slower still. Accordingly, the time needed (or number of samples needed to be read) before stable samples may be provided is quite high and results in significant latency.

SUMMARY

Systems, methods, and apparatus are described herein for improving equalization when reading data from a storage medium. Data read from a storage medium is first processing through a first data path. The first data path includes a first decoder configured to decode data output from at least one first finite impulse response (FIR) filter and first FIR adaptation circuitry configured to adjust a first FIR coefficient for the at least one first FIR filter. The data is then processed through a second data path, which includes at least one second FIR filter and second FIR adaptation circuitry configured to adjust a second FIR coefficient to reach an FIR coefficient for the at least one second FIR filter that achieves a target minimum number of errors. The second FIR adaptation circuitry is configured to reach the FIR coefficient that achieves the target minimum number of errors faster than the first FIR adaptation circuitry. A second decoder in the second data path is configured to decode data output by the at least one second FIR filter.

In some implementations, at least one analog signal receiver is present and configured to receive a signal from at least one read head. There may also be at least one analog-to-digital converter (ADC) configured to convert the analog signals to digital samples.

In some implementations, the first decoder is a Viterbi detector. Other suitable decoders and detectors may also be used.

In some implementations, two FIR filters are present in the first data path. A first output of the first FIR filter may be combined with a second output of the second FIR filter to produce a single equalized signal.

In some implementations, the first data path also includes error detection circuitry configured to determine an amount of error in data output from the at least one first FIR filter and the decoder. In an implementation, the first FIR adaptation circuitry may include and FIR adaptation loop configured to adjust the first FIR coefficient based on the amount of error and transmit the adjusted first FIR coefficient to the at least one first FIR filter.

In some implementations, the first data path further includes a timing loop configured to adjust a read timing based on the amount of error, and phase lock loop (PLL) circuitry configured to generate a PLL signal based on an output of the timing loop. A sampling phase and/or a sampling frequency of the ADC may be controlled based on the PLL signal. In an implementation, the PLL circuitry is further configured to transmit the PLL signal to the ADC.

In some implementations, the first data path includes a gain loop configured to adjust a read gain based on the amount of error. A variable gain amplifier may also be present and configured to vary a signal gain for signals received from one or more read heads based on an output of the gain loop.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
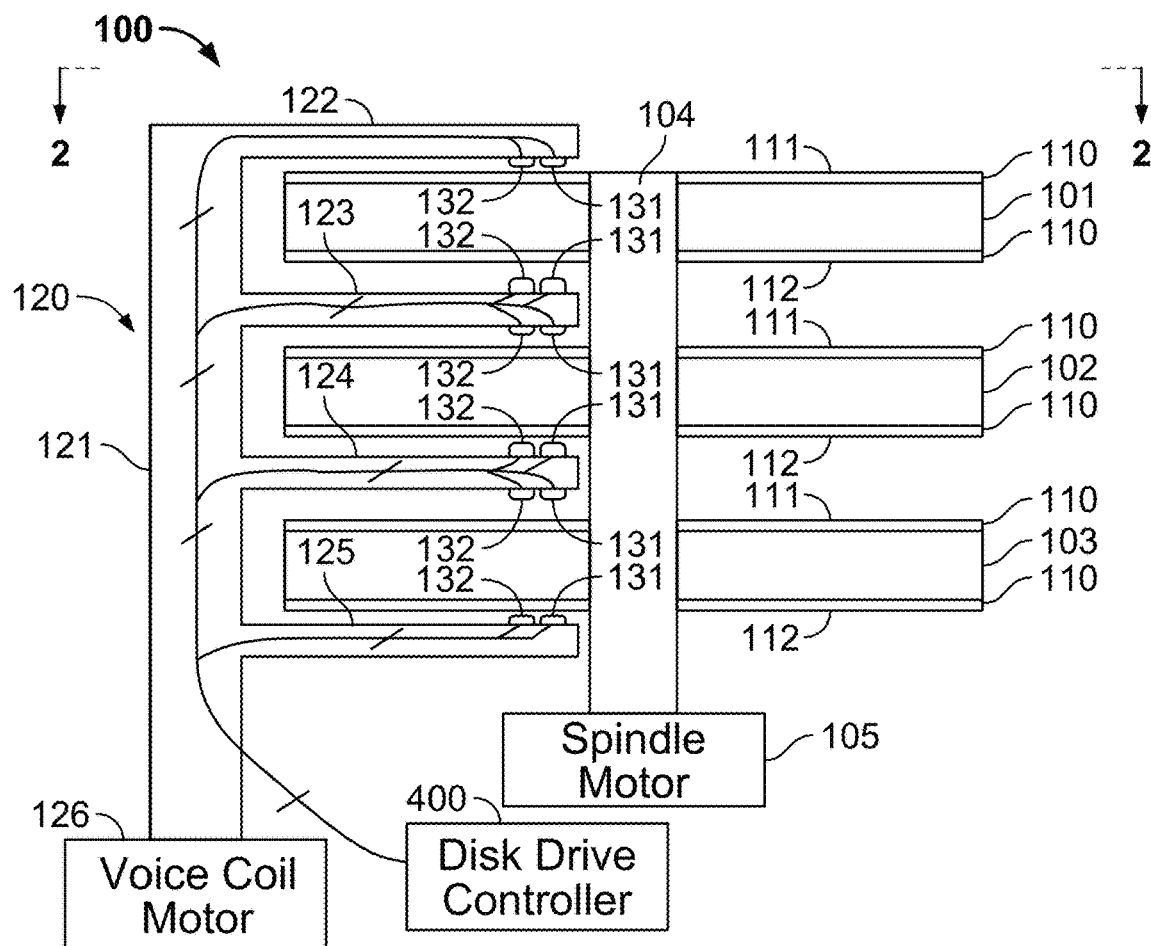
FIG. 1 is a vertical cross-sectional schematic view of a disk drive with which the subject matter of this disclosure may be used.
Figure 2:
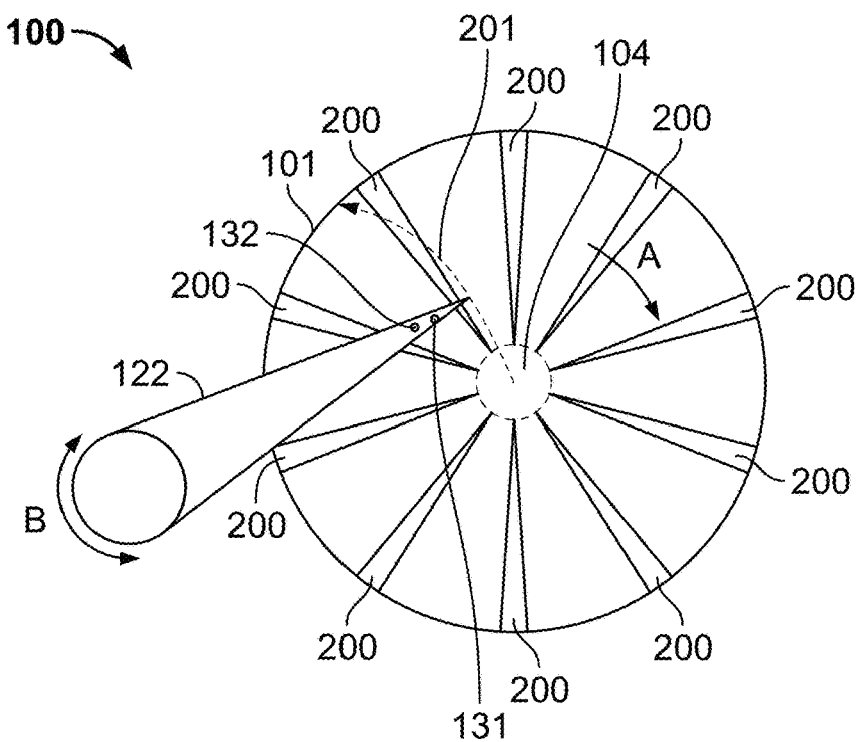
FIG. 2 is a plan view, taken from line 2-2 of FIG. 1, of a disk drive with which the subject matter of this disclosure may be used.

FIGS. 1 and 2 show an example of a disk drive 100 with which the subject matter of the present disclosure may be used. In this particular example, disk drive 100 has three platters 101, 102, 103, although any suitable number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes one or more actuators 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). It should be noted that FIGS. 1 and 2 are schematic only and not to scale. For example, the spindle diameter may be larger by comparison to the disk diameter.

A motor 126, commonly referred to as a "voice-coil motor," rotates actuator 121 back and forth along the directions of arrow B (FIG. 2) to move the heads 131, 132 along the path indicated by dashed arrow 201, although arms 122-125 normally cannot point directly at the center of the disk. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

In accordance with implementations of the subject matter of this disclosure, and as described in commonly-assigned U.S. Pat. No. 11,061,582, incorporated herein by reference in its entirety, logical sectors, also known as "codewords," may be interleaved across multiple physical sectors (e.g., on a single track) when storing data. Logical sectors are data sectors as received from a host device, which may contain a certain amount—typically 4 kB—of data. Physical sectors are angular portions of individual tracks on the surface of a disk platter. Physical sectors typically are sized so that one physical sector can store one logical sector's worth of data. Typically, all of the data stored in a physical sector may be from a single logical sector, but in above-incorporated U.S. Pat. No. 11,061,582, the data from a single logical sector may be spread over multiple physical sectors.

Figure 3:
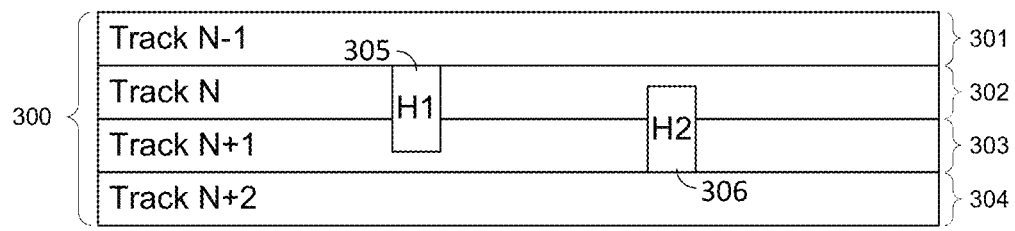
FIG. 3 shows a simplified schematic view of a portion of a storage device.

FIG. 3 shows a simplified schematic view of a portion of a storage device showing four adjacent data tracks 301, 302, 303, 304 on a storage medium 300, with two read heads 305, 306. Read heads 305 and 306 are positioned so that both read heads 305 and 306 are over tracks N (302) and N+1 (303), with read head 305 mainly over track N (302) and read head 306 mainly over track N+1 (303). While the tracks are shown in this and other drawings as being straight, in reality, on the surface of a disk drive platter, the tracks ordinarily would be curved.

As is known, data may be written "downtrack"—i.e., along each track 302, 303, and by reading portions of the two tracks 302, 303 twice using the two read heads 305, 306, ITI may be cancelled out to provide clean data from each of tracks 302, 303.

Figure 4:
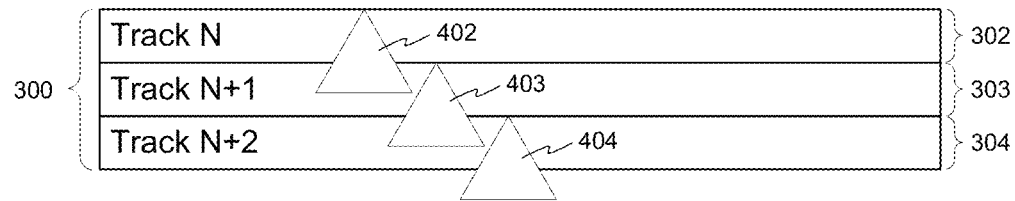
FIG. 4 shows a first writing scenario in which a number of heads are aligned to each track.
Figure 5:
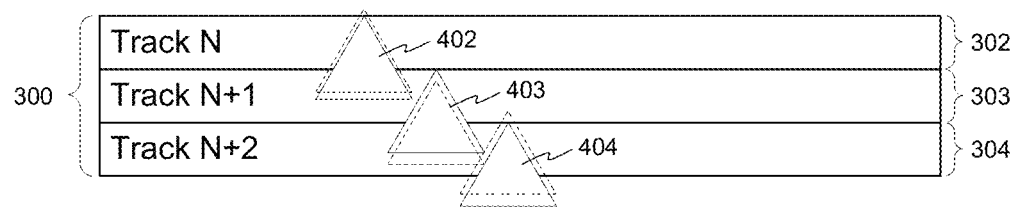
FIG. 5 shows a second writing scenario in which a number of heads are out of alignment with each track.

The writing operation is shown for three tracks N (302), N+1 (303) and N+2 (304) in FIGS. 4 and 5. In FIG. 4, each of write heads 402, 403, 404 writes to one of tracks N (302), N+1 (303) and N+2 (304), respectively. In this idealized write scenario, write heads 402, 403, 404 maintain alignment with tracks N (302), N+1 (303) and N+2 (304), respectively, resulting in tracks of uniform pitch. However, a real scenario is more likely to resemble FIG. 5, where write heads 402, 403, 404 vary in alignment with respective tracks N (302), N+1 (303) and N+2 (304), resulting in varying track pitch, and consequently in ITI. As discussed above, ITI may be overcome in a known manner by reading the same tracks with two different read heads 305, 306, each differently aligned with respect to a target track and an interfering track, so that the interfering track signals can be filtered or subtracted out.

Figure 6:
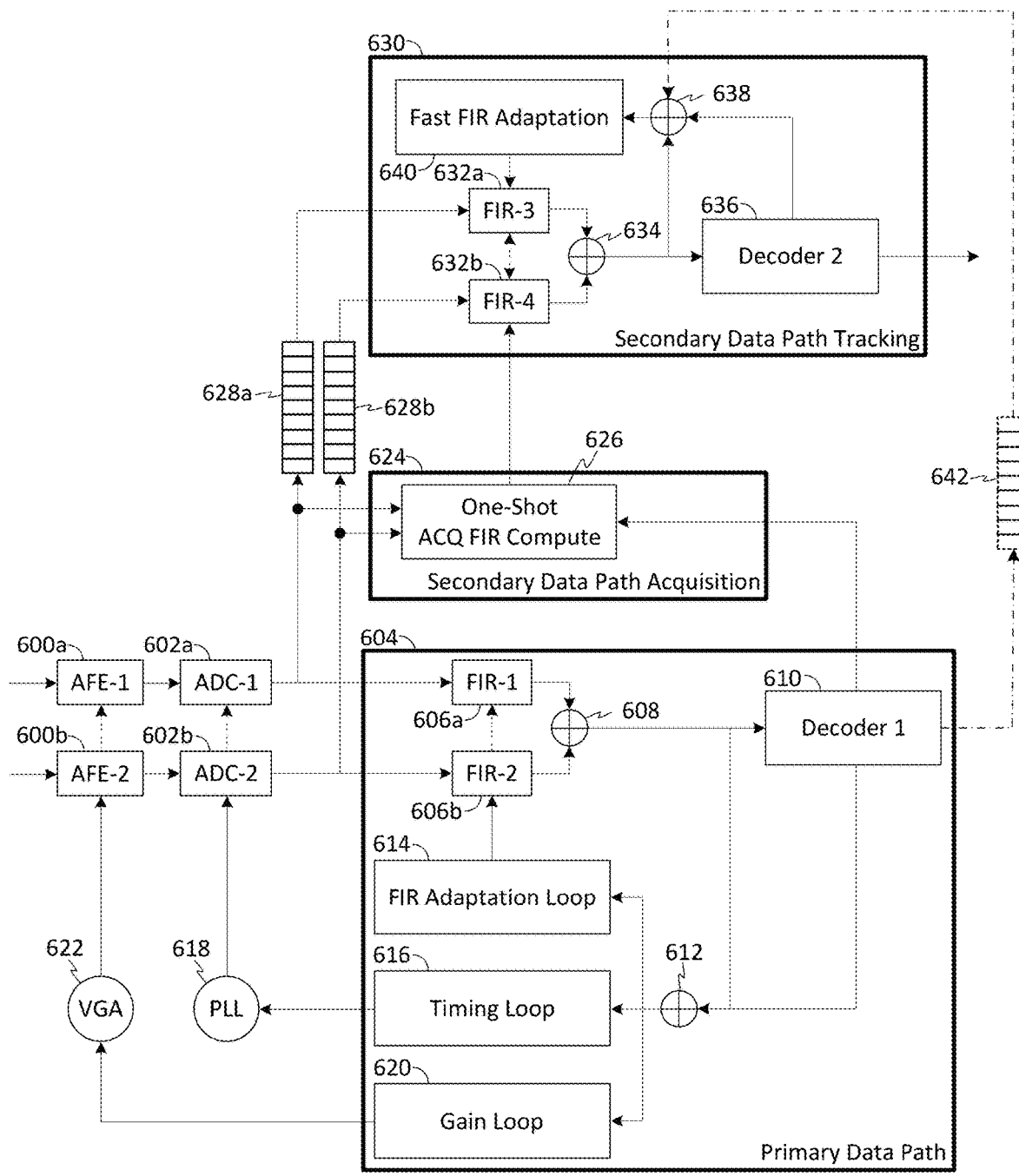
FIG. 6 shows components, and dataflow therebetween, in a system for improved reading of data from magnetic storage media according to implementations of this disclosure.

FIG. 6 shows components and dataflow therebetween of a system for improved reading of data from magnetic storage media according to implementations of this disclosure. A signal from a read head is received at a corresponding analog front end component (AFE) 600a. In TDMR, two read heads may be used simultaneously. The signal from a second read head is received at corresponding AFE 600b. The analog signals are processed through analog-to digital converters (ADCs) 602a, 602b to convert each analog signal to a digital sample. A given sector may store enough data to make up 40,000 samples. The sampling frequency of ADCs 602a and 602b is variable and can be controlled through a phase-lock loop (PLL) signal asserted by PLL circuitry 618.

The digital samples produced by ADCs 602a and 602b are stored in buffers 628a and 628. A threshold number of samples, e.g., 2,000 samples, are also processed through primary data path 604, which is a first stage of the circuitry. The digital samples are fed through corresponding FIR filters 606a and 606b. A baseline FIR coefficient may be set for FIR filters 606a and 606b. For example, an FIR coefficient calculated to compensate for a 30-percent off-track position of a read head may be used to begin the data read procedure. The filtered samples are combined at circuitry 608 to form a single filtered sample, which is then transmitted to a first decoder 610. Decoder 610 may be, for example, a Viterbi detector.

Both the decoded data output from detector 610 and the combined filtered sample output from circuitry 608 are transmitted to circuitry 612 which is configured to determine an amount of error in the decoded data. The amount of error determined by circuitry 612 is used to adjust one or more read parameters. For example, based on the amount of error, circuitry 612 may transmit the amount of error to FIR adaptation circuitry 614. Based on the amount of error, FIR adaptation circuitry 614 may calculate a new FIR coefficient to reduce the amount of error. FIR adaptation circuitry 614 then transmits the new FIR coefficient to FIR filters 606a and 606b. FIR filters 606a and 606b then use the new coefficient to filter the next sample.

As another example, circuitry 612 may transmit the amount of error to timing loop 616. Timing loop 616 may determine, based on the amount of error, that the sampling frequency of ADCs 602a and 602b should be adjusted. Timing loop 616 may calculate a new sampling rate and transmit the new sampling rate to PLL circuitry 618. PLL circuitry 618 generates a PLL signal which is asserted on ADCs 602a and 602b to control the sampling frequency.

In a third example, circuitry 612 may transmit the amount of error to gain loop 620. Gain loop 620 may determine, based on the amount of error, that a signal-to-noise ratio of the analog signal received at AFEs 600a and 600b is too low. Gain loop 620 may calculate a new gain level, which is then transmitted to variable gain amplifier 622. Variable gain amplifier 622 then controls the gain of the signal received at AFEs 600a and 600b.

In some implementations, circuitry 612 may take any one or more of these actions in response to any given amount of error.

After processing the threshold number of samples, the decoded data output from decoder 610 and the sample output from ADCs 602a and 602b are transmitted to a second stage of the circuitry. This second stage, secondary data path acquisition 624, includes a one-shot FIR filter coefficient computation circuitry 626 that is configured to compute an FIR filter coefficient that is much closer to an optimal filter coefficient than could otherwise be achieved in the primary data path. An optimal filter coefficient is one that leads to a target minimum number of errors. The one-shot computation circuitry 626 uses the samples and decoded data to determine this optimal FIR coefficient. In some implementations, one-shot computation circuitry 626 uses a recursive least squares algorithm to calculate the optimal coefficient. The optimal coefficient is then transmitted to a third stage of the system—the secondary data path tracking stage 630—where it is applied to FIR filters 632a and 632b.

The samples previously stored in buffers 628a and 628b are then fed through FIR filters 632a and 632b. As in the primary data path, the filtered samples are combined at circuitry 634 to form a single filtered sample. While the particular sample was previously filtered and decoded in the primary data path, it was processed with an FIR filter coefficient that was much farther from being optimized than the filter coefficient applied to FIR filters 632a and 632b. Accordingly, the filtering performed in the secondary data path may yield a better sample than the primary data path did.

As in the primary data path, the combined filtered sample is transmitted to a second decoder 636. In some implementations, decoder 636 is a Viterbi detector. The decoded data output by the decoder is transmitted to other system components as dictated by the particular system in which the apparatus according to this disclosure may be implemented. The decoded data, as well as the filtered sample, are also transmitted to circuitry 638 to determine an amount of error in the filtered sample. The amount of error determined by circuitry 638 is transmitted to fast FIR adaptation circuitry 640, which further refines the FIR coefficient and applies it to FIR filters 632a and 632b for use in filtering the next sample. In some implementations, fast FIR adaptation circuitry 640 uses a least mean squares algorithm or a recursive least squares algorithm to refine the FIR coefficient. Fast FIR adaptation circuitry 640 is able to adjust the FIR coefficient faster than FIR adaptation circuitry 614 in the primary data path because it is not affected by any other parameter adjustment. The gain and timing parameters are controlled in the primary data path, and no further adjustments to those parameters are made in the secondary data path. Adjustments can thus be freely made to the FIR coefficient in the secondary data path without regard to the other parameters. Thus, while the primary data path is responsible for providing stable samples, the purpose of the secondary data path is to perform faster and better equalization.

In some implementations, secondary data path tracking stage 630 does not include a second decoder (e.g., decoder 636). Instead, the output of decoder 610 may be buffered (e.g., in buffer 642) and supplied to error determining circuitry 638 to perform fast FIR adaptation. In such implementations, refinement of the FIR coefficient by fast FIR adaptation circuitry 640 is slower to reach an optimal FIR coefficient compared with implementations in which second decoder 636 is present. Nevertheless, decoder 636 may be omitted from secondary data path tracking stage 630 to reduce production costs, power requirements, or system resource usage.

Figure 7:
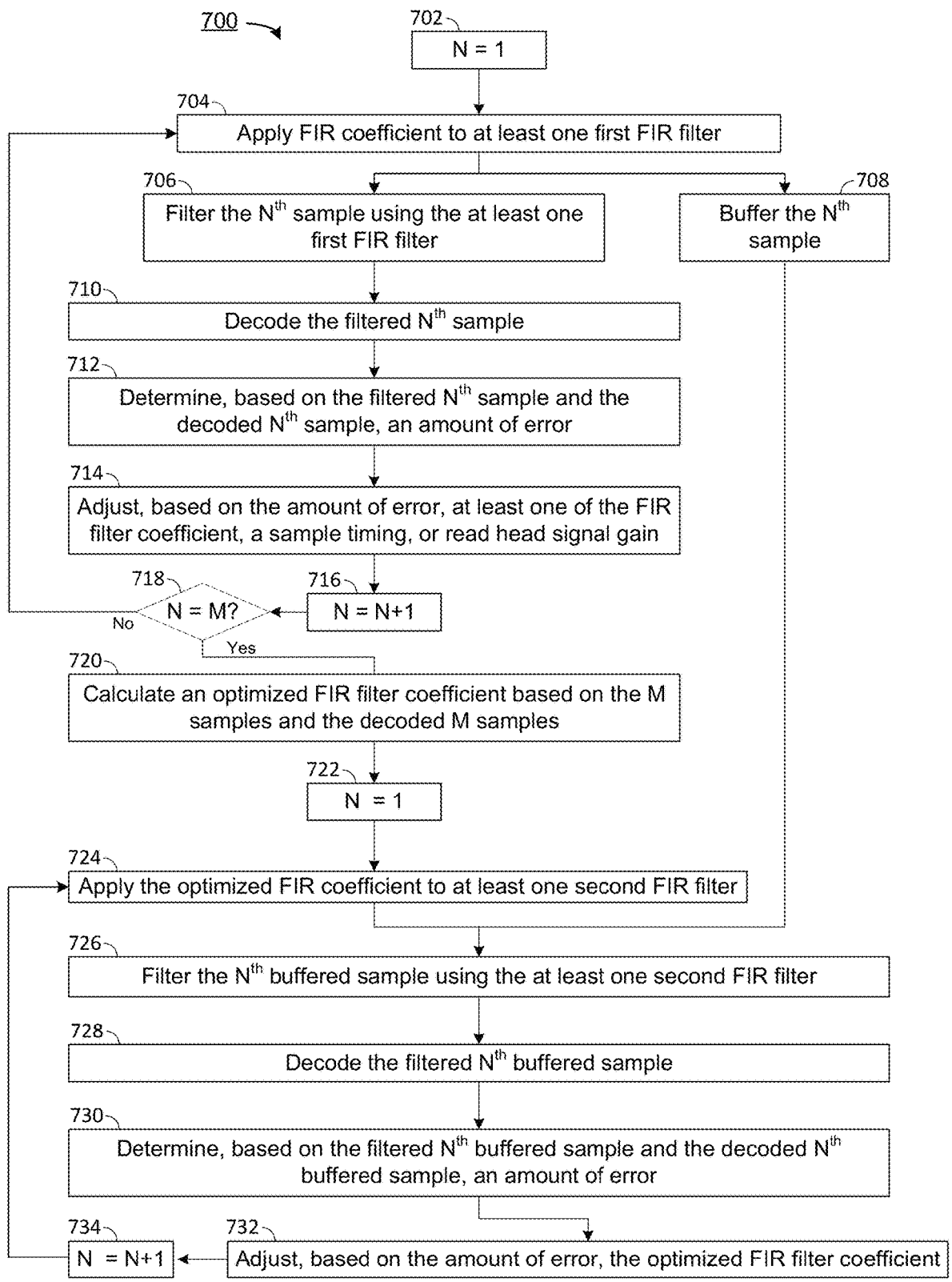
FIG. 7 is a flow diagram illustrating a method according to implementations of the subject matter of this disclosure.

FIG. 7 is a flow diagram illustrating a method according to implementations of the subject matter of this disclosure. Implementations of the subject matter of this disclosure begin reading a sector using preset timing, gain, and FIR filter parameters and adjust these parameters as reading progresses. At 702, a control circuitry (e.g., a processor, an ASIC, an FPGA, or any other suitable controller configured according to this disclosure) initializes a counter variable N, setting its value to one. At 704, an FIR coefficient is applied to at least one first FIR filter. The FIR coefficient may be a preset coefficient selected for filtering samples read by, for example, a read head in a 30-percent off-track position. At 706, the $N^{th}$ sample is filtered using the at least one first FIR filter. The $N^{th}$ sample is also stored in a buffer.

At 710, the filtered $N^{th}$ sample is decoded. For example, the filtered $N^{th}$ sample is processed using a Viterbi detector to detect a bit pattern within the filtered sample. At 712, an amount of error in the decoded sample is determined based on the filtered sample and the decoded sample.

Based on the amount of error, at 714, one or more read parameters are adjusted. The read parameters include the FIR coefficient, sampling frequency, and read head signal gain. The adjusted parameters are applied to the appropriate system components. An adjusted FIR coefficient is applied to the at least one first FIR filter. An adjusted sampling frequency is applied to a PLL circuit configured to output a PLL signal used to control the sampling frequency of an ADC through which analog signals from a read head are processed. An adjusted signal gain value is applied to a variable gain amplifier which controls the gain of read head signals.

At 716, the control circuitry increments the value of N by one. At 718, the control circuitry determines whether the value of N is now equal to a threshold number of samples M. For example, the first stage (e.g., the primary data path) may be configured to process the first 2,000 samples from a sector before the second and third stages take over. If N is not yet equal to M ("No" at 718), then processing returns to 704.

If N is equal to M ("Yes" at 718), meaning that the threshold number of samples have been processed through the first stage, then, at 720, an optimized FIR filter coefficient is calculated based on the M samples and the decoded M samples. This second stage may use a recursive least squares algorithm to calculate the optimized FIR coefficient.

At 722, the control circuitry resets the value of N to one. At 724, the optimized FIR coefficient is applied to at least one second FIR filter. This begins the third stage of the system, i.e., the second data path tracking. At 726, the $N^{th}$ buffered sample is retrieved from the buffer and filtered using the at least one second FIR filter. If two read heads are used, there may by two corresponding buffers and two corresponding FIR filters in the third stage. The output of the FIR filters in combined to form a single filtered $N^{th}$ buffered sample, which, at 728, is decoded. As in the first stage, the decoder may be a Viterbi detector.

At 730, an amount of error in the decoded sample is determined based on the filtered sample and the decoded sample. Based on the amount of error, at 732, the optimized FIR coefficient is further adjusted. In some implementations, a least mean squares algorithm or a recursive least squares algorithm is used to calculate an adjusted optimized FIR coefficient.

At 734, the control circuitry increments the value of N by one, and processing returns to 724. This process continues until the entire sector has been read. When a new sector is to be read, the process starts again at 702.

By using this process, the error rate in the decoded data that is actually passed to other components of the system architecture is greatly reduced. This is due to the first stage processing in the primary data path, in which a number of samples are processed to optimize the read parameters. The second stage (second data path acquisition) then calculates an optimized FIR coefficient and applies it to the third stage (secondary data path tracking). The third stage then begins processing the data from the first sample using a more optimal FIR coefficient than was available in the first stage. As the third stage makes further adjustments to the FIR coefficient, the error rate is further reduced, and reaches its minimum value after far fewer samples than in a single-stage system (e.g., the primary data path alone).

It has been observed that implementations of the disclosure result in an improvement in error reduction between a first stage and a third stage. The first stage error rate is reduced slowly, and is still appreciable even after 10,000 samples have processed. In contrast, the third stage error rate not only begins at a much lower value than the first stage error rate, but is also reduced much faster than that of the first stage. Implementations of the system of this disclosure may reach the minimum error rate in the third stage within 2,000 samples or less. This is achieved by "jump starting"

the third stage with a more optimized FIR coefficient computed at the second stage, as described in detail above.

The disclosure to this point has discussed a system having two data paths. However, additional data paths can be added on top of each other in a similar manner. Each successive data path, jump started with an FIR coefficient calculated from the output of the preceding data path, will be able to reach an optimal coefficient faster than any of the preceding data paths. For each additional data path added, an additional buffer is needed. As data processing moves to each successive data path after the preceding data path has processed a threshold number of samples, each additional buffer may be of a larger size.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. An apparatus for improving equalization when reading data from a storage medium, the apparatus comprising:
   a first data path comprising:
      a first decoder configured to decode data output from at least one first finite impulse response (FIR) filter; and
      first FIR adaptation circuitry configured to adjust a first FIR coefficient for the at least one first FIR filter; and
   a second data path comprising:
      at least one second FIR filter;
      second FIR adaptation circuitry configured to adjust a second FIR coefficient to reach an FIR coefficient for the at least one second FIR filter that achieves a target minimum number of errors, wherein the second FIR adaptation circuitry reaches the FIR coefficient that achieves the target minimum number of errors faster than the first FIR adaptation circuitry; and
      a second decoder configured to decode data output by the at least one second FIR filter.

2. The apparatus of claim 1, further comprising at least one analog signal receiver configured to receive a signal from at least one read head.

3. The apparatus of claim 1, further comprising at least one analog-to-digital converter (ADC).

4. The apparatus of claim 1, wherein the first decoder is a Viterbi detector.

5. The apparatus of claim 1, wherein the at least one first FIR filter comprises a first FIR filter and a second FIR filter.

6. The apparatus of claim 5, wherein a first output of the first FIR filter is combined with a second output of the second FIR filter to produce a single equalized signal.

7. The apparatus of claim 1, wherein the first data path further comprises:
   error detection circuitry configured to determine an amount of error in data output from the at least one first FIR filter and the decoder.

8. The apparatus of claim 7, wherein the first FIR adaptation circuitry comprises:
   an FIR adaptation loop configured to:
      adjust the first FIR coefficient based on the amount of error; and
      transmit the adjusted first FIR coefficient to the at least one first FIR filter.

9. The apparatus of claim 7, wherein the first data path further comprises:
   a timing loop configured to adjust a read timing based on the amount of error; and
   phase lock loop (PLL) circuitry configured to generate a PLL signal based on an output of the timing loop,
   wherein the apparatus is configured to control at least one of a sampling phase and sampling frequency based on the PLL signal.

10. The apparatus of claim 9, further comprising at least one ADC, wherein the PLL circuitry is further configured to transmit the PLL signal to the at least one ADC.

11. The apparatus of claim 7, wherein the first data path further comprises:
   a gain loop configured to adjust a read gain based on the amount of error; and
   a variable gain amplifier configured to vary a signal gain for signals received from one or more read heads based on an output of the gain loop.

12. A method for improving equalization when reading data from a storage medium, the method comprising:
   at a first data path:
      decoding, at a first data path using a first decoder, data output from at least one first finite impulse response (FIR) filter; and
      adjusting, using first FIR adaptation circuitry, a first FIR coefficient for the at least one first FIR filter; and
   at a second data path:
      adjusting, using second FIR adaptation circuitry, a second FIR coefficient to reach an FIR coefficient for at least one second FIR filter that achieves a target minimum number of errors, wherein the second FIR adaptation circuitry reaches the FIR coefficient that achieves the target minimum number of errors faster than the first FIR adaptation circuitry; and
      decoding, using a second decoder, data output by at least one second FIR filter.

13. The method of claim 12, further comprising receiving at least one analog signal from at least one read head.

14. The method of claim 13, further comprising processing the at least one analog signal using at least one analog-to-digital converter (ADC).

15. The method of claim 12, wherein the first decoder is a Viterbi detector.

16. The method of claim 12, wherein the at least one first FIR filter comprises a first FIR filter and a second FIR filter.

17. The method of claim 16, further comprising:
   combining a first output of the first FIR filter with a second output of the second FIR filter to produce a single equalized signal.

18. The method of claim 12, further comprising:
   determining, at the first data path using error detection circuitry, an amount of error in data output from the at least one first FIR filter and the decoder.

19. The method of claim 18, wherein adjusting, using first FIR adaptation circuitry, a first FIR coefficient for the at least one first FIR filter further comprises:
   adjusting, using an FIR adaptation loop, the first FIR coefficient based on the amount of error; and
   transmitting the adjusted FIR coefficient to the at least one first FIR filter.

20. The method of claim 18, further comprising:
   adjusting, at the first data path using a timing loop, a read timing based on the amount of error;
   generating, using phase lock loop (PLL) circuitry, a PLL signal based on an output of the timing loop; and
   controlling at least one of a sampling phase and a sampling frequency based on the PLL signal.

21. The method of claim 20, further comprising:
   processing the at least one analog signal using at least one ADC; and
   transmitting the PLL signal to the at least one ADC.

22. The method of claim 18, further comprising:
   adjusting, at the first data path using a gain loop, a read gain based on the amount of error; and
   varying, using a variable gain amplifier, a signal gain for signals received from one or more read heads based on an output of the gain loop.

23. An apparatus for improving equalization when reading data from a storage medium, the system comprising:
   at a first data path:
      means for decoding data output from at least one first finite impulse response (FIR) filter; and
      means for adjusting a first FIR coefficient for the at least one first FIR filter; and
   at a second data path:
      means for adjusting a second FIR coefficient to reach an FIR coefficient for at least one second FIR filter that achieves a target minimum number of errors, wherein the means for adjusting the second FIR coefficient reaches the FIR coefficient that achieves the target minimum number of errors faster than the means for adjusting the first FIR coefficient; and
      means for decoding data output by at least one second FIR filter.

24. The apparatus of claim 23, further comprising means for receiving at least one analog signal from at least one read head.

25. The apparatus of claim 24, further comprising means for processing the at least one analog signal using at least one analog-to-digital converter (ADC).

26. The apparatus of claim 23, wherein the first decoder is a Viterbi detector.

27. The apparatus of claim 23, wherein the at least one first FIR filter comprises a first FIR filter and a second FIR filter.

28. The apparatus of claim 27, further comprising:
   means for combining a first output of the first FIR filter with a second output of the second FIR filter to produce a single equalized signal.

29. The apparatus of claim 23, further comprising:
   means for determining, at the first data path, an amount of error in data output from the at least one first FIR filter and the decoder.

30. The apparatus of claim 29, wherein the means for adjusting a first FIR coefficient further comprises:
   means for adjusting, at the first data path, the first FIR coefficient based on the amount of error; and
   means for transmitting the adjusted first FIR coefficient to the at least one first FIR filter.

31. The apparatus of claim 29, further comprising:
   means for adjusting, at the first data path, a read timing based on the amount of error;
   means for generating a phase lock loop (PLL) signal based on the adjusted read timing; and
   means for controlling at least one of a sampling phase and a sampling frequency based on the PLL signal.

32. The apparatus of claim 31, further comprising:
   means for processing the at least one analog signal; and
   means for transmitting the PLL signal to the means for processing the at last one analog signal.

33. The apparatus of claim 29, further comprising:
 means for adjusting, at the first data path, a read gain based on the amount of error; and
 means for varying a signal gain for signals received from one or more read heads based on the adjusted read gain.

\* \* \* \* \*